United States Patent
Tange

(10) Patent No.: US 6,964,721 B2
(45) Date of Patent: Nov. 15, 2005

(54) PROCESS FOR MANUFACTURING ELASTICALLY STRETCHABLE AND CONTRACTIBLE COMPOSITE SHEET

(75) Inventor: Satoru Tange, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 509 days.

(21) Appl. No.: 09/944,477

(22) Filed: Aug. 31, 2001

(65) Prior Publication Data

US 2002/0023711 A1 Feb. 28, 2002

(30) Foreign Application Priority Data

Aug. 31, 2000 (JP) .............................. 2000-262655

(51) Int. Cl.[7] .............................................. B32B 31/00
(52) U.S. Cl. ..................... 156/164; 156/160; 156/163; 156/229; 156/290
(58) Field of Search ............................... 156/160, 164, 156/163, 229, 290, 296, 308.2

(56) References Cited

U.S. PATENT DOCUMENTS

| | | | |
|---|---|---|---|
| 4,107,364 A | * | 8/1978 | Sisson ......................... 428/196 |
| 4,525,407 A | * | 6/1985 | Ness ........................... 428/198 |
| 4,720,415 A | | 1/1988 | Vander Wielen et al. |
| 4,781,966 A | | 11/1988 | Taylor |
| 5,376,198 A | | 12/1994 | Fahrenkrug et al. |
| 5,543,206 A | * | 8/1996 | Austin et al. ................ 428/198 |
| 5,683,787 A | | 11/1997 | Boich et al. |
| 5,769,993 A | | 6/1998 | Baldauf |
| 5,939,178 A | | 8/1999 | Boich |

FOREIGN PATENT DOCUMENTS

| EP | 0 566 749 | 8/1993 |
|---|---|---|
| JP | 8-504693 | 5/1996 |

OTHER PUBLICATIONS

Copy of European Search Report dated Jul. 19, 2002.

\* cited by examiner

*Primary Examiner*—Jeff H. Aftergut
(74) *Attorney, Agent, or Firm*—Butzel Long

(57) ABSTRACT

A process for manufacturing a composite sheet by joining a second of thermoplastic synthetic fiber and capable of inelastic extension to at least one surface of a first web capable of elastic strech and contraction in an intermittent manner. The process includes a step of extending the first web, a step of joining the second web to the extended first web and a step of extending the joined first and second webs.

5 Claims, 4 Drawing Sheets

PROCESS FOR MANUFACTURING ELASTICALLY STRETCHABLE AND CONTRACTIBLE COMPOSITE SHEET

BACKGROUND OF THE INVENTION

The present invention relates to a process for manufacturing a composite sheet comprising a web capable of elastic stretch and contraction and a fibrous web capable of inelastic extension.

Japanese Patent Publication No. 1996-504693A discloses a multi-layered elastic panel, as one example of this type of composite sheet, and a process of manufacturing the same. The disclosed manufacturing process of a multi-layered elastic panel involves arranging a rubber elastic layer and an inelastic fibrous layer, one over another, joining them intermittently, extending the combination up to the vicinity of a breaking extension limit of the inelastic fibrous layer and finally relaxing the combination from tension.

In the composite sheet (elastic panel) obtained via the above-specified known manufacturing process, the rubber elastic layer after removal of the tension is unable to return to its original dimension. The resulting difference in dimension sometimes produces a permanent strain in the composite sheet. Such a permanent strain is a first factor that makes the composite sheet larger in dimension along a direction of extension than before it is subjected to extension. Also, the inelastic fibrous layer when extended undergoes plastic deformation so that its dimension after extension is made larger than before extension. When the rubber layer is relaxed from the tension, this dimensional difference causes the inelastic fibrous layer to increase its apparent bulk. The increased bulk then becomes a second factor that makes the composite sheet larger in dimension than before it is extended by restraining the rubber elastic layer from relaxing, i.e., by restricting elastic contraction thereof. By these first and second factors, the composite sheet when again extended to the vicinity of a breaking extension limit of the inelastic fibrous layer shows a lower percentage extension than when initially extended to the vicinity of the breaking extension limit of the inelastic fibrous layer.

The composite sheet provides a soft skin contact when the aforementioned inelastic fibrous layer is reduced in diameter and increased in apparent bulk due to elongation of constituting fibers as a result of plastic deformation. On the other hand, the increasing influence of the second factor lowers the percentage elastic extension of the composite sheet and thus narrows its possible range of elastic stretch and contraction, so that the composite sheet is made less elastically stretchable and contractible.

SUMMARY OF THE INVENTION

It is an object of the present invention to provide a process for manufacturing a composite sheet which can reduce the influence of the above-described second factor encountered in the known manufacturing process and thus widen the range that permits elastic stretch and contraction of the sheet.

To achieve this object, the present invention is directed to a process for manufacturing a composite sheet capable of elastic stretch and contract in one direction, which includes the steps of continuously feeding a first web capable of elastic stretch and contraction in the one direction and having a top surface and a bottom surface, continuously feeding a second web capable of inelastic extension and composed of thermoplastic synthetic fibers on at least one surface of the first web, and joining the first and second webs in an intermittent manner along the one direction.

The manufacturing process further includes the following steps:

a. a first extension step wherein the first web is fed in a continuous manner in the one direction and extended in the one direction within the range that permits elastic stretch and contraction of the first web;

b. a step wherein the second web is superimposed on at least one surface of the first web and joined thereto in an intermittent manner along the one direction to provide a composite web;

c. a second extension step wherein the composite web is extended in the one direction within the range that permits elastic stretch and contraction of the first web; and d. a step wherein, after the second extension step, the extended composite web is allowed to retract by an elastic contraction force of the first web to thereby obtain the composite sheet.

DETAILED DESCRIPTION OF THE PREFERRED EMBODIMENTS

The process for manufacturing an elastically stretchable and contractible composite sheet in accordance with the present invention is below described in detail with reference to the attached drawings.

Figure 1:
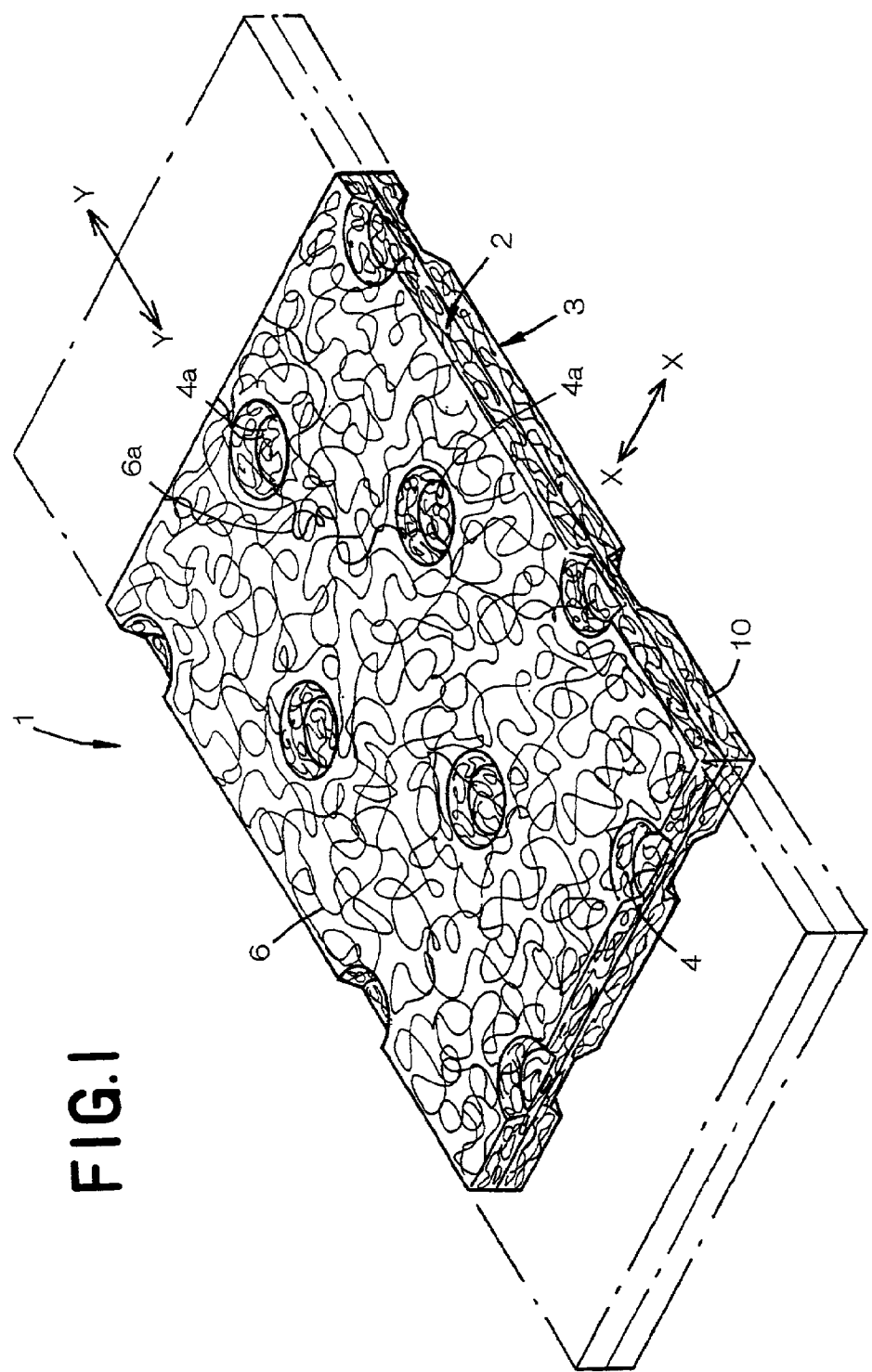
FIG. 1 is a perspective view of a composite sheet.

FIG. 1 is a perspective view of an elastically stretchable and contractible composite sheet 1 manufactured by the practice of the method according to the present invention. The composite sheet 1 is suitable for use as a liquid permeable or impermeable facing material of a disposable wearing article such as a disposable diaper, a sanitary napkin, a disposable medical gown or the like, and has an upper layer 2 and a lower layer 3 united together at bond areas 4 by fusion. The composite sheet 1 is elastically stretchable and contractible at least in the Y—Y direction, out of mutually-perpendicular double-headed arrows X—X and Y—Y, as shown by chain lines.

The upper layer 2 of the composite sheet 1 is capable of inelastic extension at least in the Y—Y direction, out of the X—X and Y—Y directions. Such an upper layer 2 comprises a mass of thermoplastic synthetic fibers extending continuously between bond areas 4 and 4, preferably long fibers, more preferably a mass of continuous fibers 6. In the preferred upper layer 2, the fibers 6 are fused to each other at bond areas 4 but are individualized between bond areas 4 such that they are neither fused nor mechanically entangled tightly with each other. The length of a portion of the individual fiber 6 that extends between adjacent bond areas 4, e.g., the length of a portion of the fiber 6a that extends between bond areas 4a and 4a is larger than a linear distance between the bond areas 4a and 4a. That is, the fiber 6 extends over an upper surface of the lower layer 3 while describing the shown irregular curves. When the composite sheet 1 is extended in the Y—Y direction, the fibers 6 change their orientations between the bond areas 4 and 4 to extend linearly along the Y—Y direction. As the composite sheet 1 retracts, the fibers 6 describe curves again.

The lower layer 3 of the composite sheet 1 is elastically stretchable and contractible in the Y—Y direction, preferably in both the X—X and Y—Y directions. The lower layer 3 comprises a mass of short, long or continuous fibers made of elastic materials such as thermoplastic elastomers, or alternatively, comprises a film or the like made of such elastic materials. In the case of fibers, the lower layer takes the form of a non-woven or woven fabric, preferably via integration of fibers by fusion or mechanical entanglement. The lower layer 3 operates such that it extends elastically as the composite sheet 1 is extended in the Y—Y direction by an external force and causes the composite sheet 1 to retract as the composite sheet 1 is freed from the force.

Figure 2:
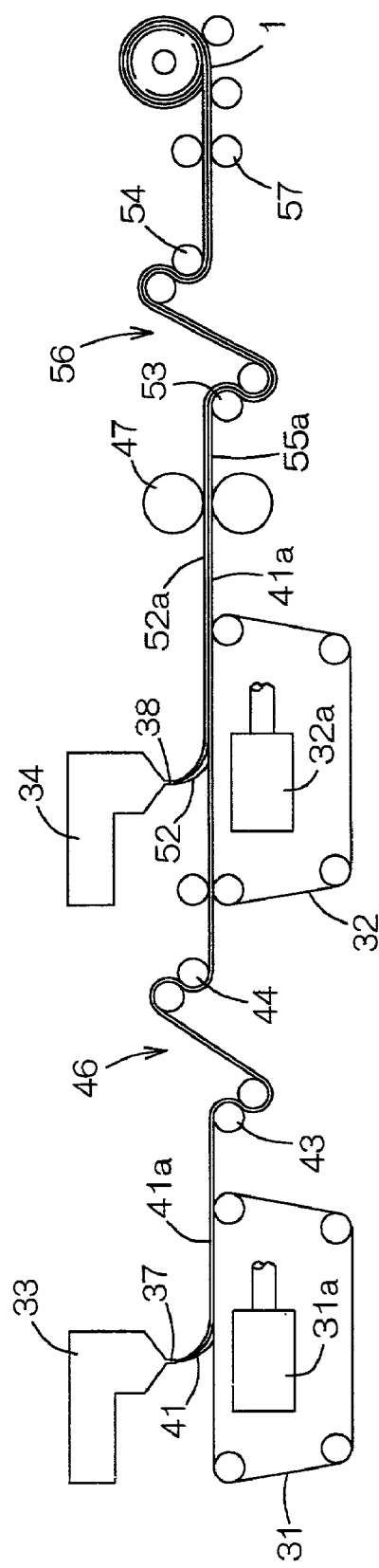
FIG. 2 is a view showing an exemplary process for manufacturing the composite sheet.

FIG. 2 is a diagram illustrating a manufacturing process of the composite sheet 1 shown in FIG. 1. On the left side of the drawing, a first endless belt 31 and a second endless belt 32 are juxtaposed to both run toward the right. A first extruder 33 and a second extruder 34 are disposed over the endless belts 31 and 32, respectively. The extruder 33, 34 have a plurality of nozzles 37, 38 arranged in a row and transverse to the endless belt 31, 32. A suction duct 31a, 32a is disposed right under the extruder 33, 34 through the endless belt 31, 32.

First continuous fibers 41, made of a thermoplastic elastomer and capable of elastic stretch and contraction, are discharged from the nozzles 37 of the first extruder 33 and directed onto the first endless belt 31 under the suction action of the duct 31a. The first continuous fibers 41 are preferably fused to each other over the first endless belt 31 and rendered into a first web 41a having the form of a non-woven fabric. The first web is transported in a machine direction and then subjected to a first extension step 46, involving a pair of first rolls 43 and a pair of second rolls 44, where it is subjected to extension in the machine direction at a specific stretch ratio as required. In the first extension step 46, the second roll 44 rotates at a higher speed than the first roll 43. The first web 41a while in an extended state advances toward the second endless belt 32. Plural streams of second continuous fibers 52, made of a thermoplastic synthetic resin and capable of inelastic extension, are discharged from the nozzles 38 of the second extruder 34 and directed onto the first web 41a while in the extended state under the suction action of the duct 32a to form a second web 52a.

The superimposed first and second webs 41a and 52a are brought between a pair of hot emboss rolls 47 and united together by fusion at bond areas 4 (see FIG. 1) arranged at intervals in the machine direction to form a composite web 55a. The composite web 55a is controlled to further advance in the machine direction and then subjected to a second extension step 56, involving a pair of third rolls 53 and a pair of fourth rolls 54, where it is further extended in the machine direction at another specific stretch ratio as required. In the second extension step, the fourth roll 54 rotates with a faster peripheral speed than the third roll 53.

After passage between the fourth rolls 54, the composite web 55a is allowed to further advance and enter between a pair of carrying rolls 57 which rotate with almost the same peripheral speed as the first rolls 43. The composite web 55a extended in the first and second extension steps 46, 56 is released from tension in a path between the fourth roll 54 and the carrying roll 57, contracts by the action of the elastic force of the first web 41 and is then wound round a roll as the composite sheet 1.

In the process of the composite sheet 1, SEPS or the like may be used, for example, for the thermoplastic elastomer which is raw material of the first continuous fibers 41. The use of first continuous fibers 41 having a fiber diameter of 18 $\mu$m results in the first web 41a having a basis weight of 31.9 g/m$^2$. This first web 41a has a machine-direction breaking strength of 2.35 N per width of 50 mm and a breaking extension of 447%. In the first and second extension steps 46, 56, extension is performed within the range that permits elastic stretch and contraction of the first web 41a and within an extension limit of the second web 52a. For example, the first web 41a is extended in both extension steps 46, 56 by 50% per each, i.e., overall, by 100% of its original length prior to extension. In other words, the first web 41a is extended to 150% of its original length in the first extension step 46 and to 200% of its original length in the second extension step.

Examples of thermoplastic synthetic resins for use as raw material of the second continuous fibers 52 include polypropylene; a 60:40 (by weight) mixture of polypropylene and a terpolymer of propylene, ethylene and butene; polyester; polyethylene and the like. As an example, the aforementioned mixture of polypropylene and terpolymer can be used to form the second continuous fibers 52 having a diameter of 17.5 $\mu$m and an extensibility of 311% and then form the second web 52a having a basis weight of 15.0 g/m$^2$ from the fibers 52. In the second extension step 56, the second web 52a is extended in an inelastic manner by approximately 33% as the first web 41 is extended in an elastic manner by 50% (refer to FIG. 3). After passage through the fourth rolls 54, the extended second web 52a retracts in the machine direction responsive to elastic contraction of the first web 41a, while forming folds between bonded areas 4 and 4 arranged at intervals along the machine direction. The composite sheet 1 obtained in such a manner is shown in FIG. 1. The first web 41a and second web 52a are rendered by extension to take the forms of the lower layer 3 and upper layer 2 shown in FIG. 1. Formation of the bonded areas 4 shown in FIG. 1 is accomplished by passing the first and second webs 41a, 52a between the emboss rolls 47.

Figure 3:
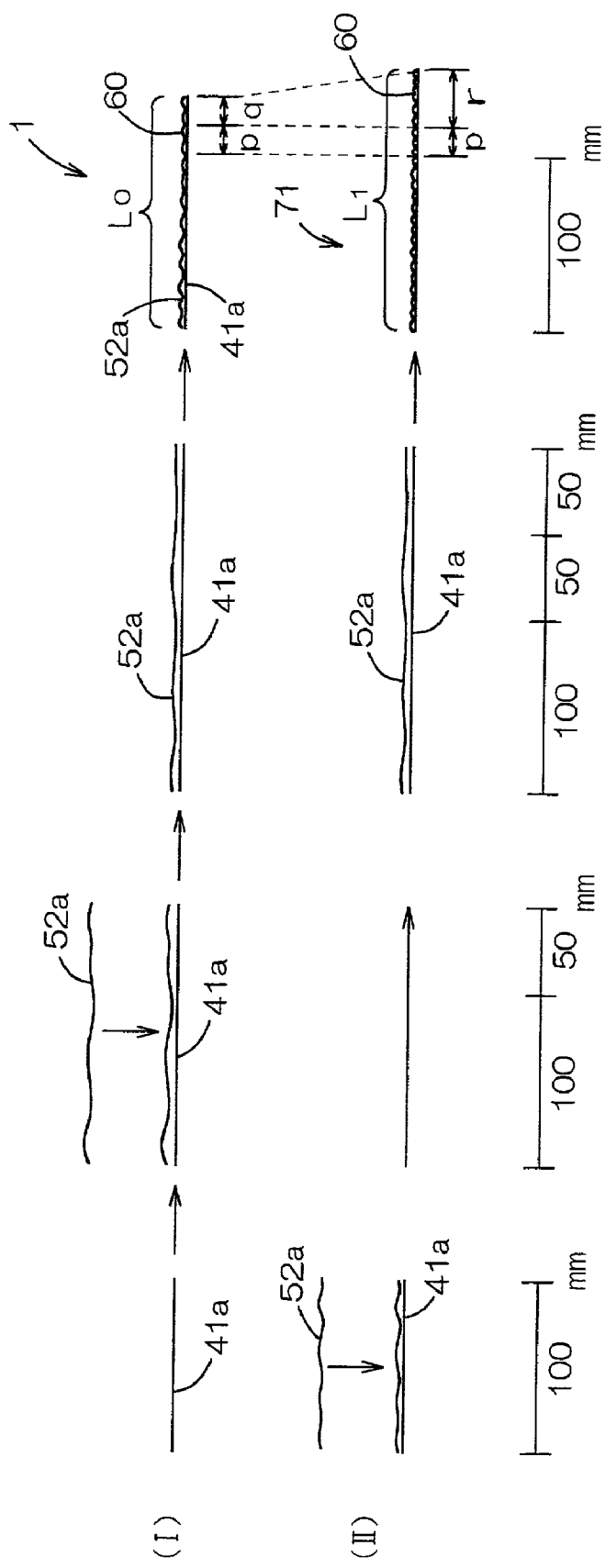
FIG. 3 is a view for explaining stretch-contraction behaviors of the composite sheet.

FIG. 3 diagrammatically shows the stretch-contraction behaviors at stages of a manufacturing process for the composite sheet 1 and a comparative stretchable composite sheet 71 obtained using a conventional process. In the case of composite sheet 1 shown in (I) of FIG. 3, a continuously-fed first web 41a is extended by 50 mm per length of 100 mm to a length of 150 mm, a 150 mm long second web 52b is placed over the first web, and both webs 41a, 52a are joined to each other at locations 4 and thereafter further extended by 50 mm. In total, the first web 41a is extended by 100%. The second web 52a is extended by 33%. These both webs 41a, 52a when untensioned provides the composite sheet 1. For the composite sheet 1, a permanent strain in length of p is produced when the 100 mm long first web 41a is extended by the length of 100 mm. Also, folds 60 are formed over an entire region of the second web 52a as the second web 52a is allowed to retract after it has been extended in an inelastic manner from its original length of 150 mm by the length of 50 mm. These folds 60 limit the elastic contraction of the first web 41a by the length of q. The composite sheet 1 has a length $L_0$ of (100+p+q) and never returns to the original length of first web 41a that is 100 mm.

On the other hand, in the manufacture of the conventional stretchable sheet 71 shown in (II) of FIG. 3, the 100 mm long second web 52a is brought to overlie the 100 mm long first web 41a. These two webs 41a, 52a are joined to each other and then extended by 100% for each. These webs 41a, 52a when untensioned provide the stretchable sheet 71. A permanent strain in length of p is produced when the first web 41a is extended from its original length of 100 mm by the length of 100 mm and left to remain in the stretchable sheet 71. Also, when the second web 52a is allowed to retract after it has been extended by the length of 100mm, folds 60 are formed therein to restrict the elastic contraction of the first web 41a by the length of r which also remains in the stretchable sheet 71. The resulting stretchable sheet 71 thus has a length $L_1$ of (100+p+r). Although the composite sheet 1 and stretchable sheet 71 both use the 100 mm long first web 41a as a starting material, the extension of the second web 52a during the manufacture of the stretchable sheet is made relatively large. Accordingly, the second continuous fibers 52 constituting the second web 52a elongate to such an extent that causes the second web 52a to increase its apparent bulk when it retracts. This increase in bulk increases the length r that limits contraction of the first web 41a. The length r is thus made larger in dimension than the length q. The length $L_0$ of the composite sheet 1 then becomes smaller in dimension than the length $L_1$ of the conventional stretchable sheet 71 and measures a value closer to the original length of the first web 41a, 100 mm. In an exemplary case where the resulting composite sheet 1 and stretchable sheet 71 are extended again to a length of 200 mm, as shown in FIG. 3, the composite sheet 1 shows a higher percentage extension. Accordingly, the composite sheet 1 can be said to be stretchable and contractible over a wider range than the stretchable sheet 71.

Also, in (I) of FIG. 3, if the permanent strain p of the first web 41a is smaller, the second web 52a fed at the length of 150 mm and then combined into the composite sheet 1 becomes possible to retract to less than 150 mm. The composite sheet 1 when extended again to a length of 200 mm shows a percentage extension higher than 33% which is a value obtained when the second web 52a was initially extended. That is, the second web 52a puckered in the composite sheet 1 shows an apparent percentage extension higher than 33% which is an initial percentage extension of the web 52a. On the other hand, in accordance with the conventional case shown in (II) of FIG. 3 where the stretchable sheet 71 is obtained via extension to 200 mm and subsequent retraction, the second web 52a initially fed at the length of 100 is maintained not to exceed 100 mm. Accordingly, when the stretchable sheet 71 is extended again to a length of 200 mm, the second web shows a percentage extension of less than 100% which is a value obtained when it was initially extended. As clear from this comparison, in accordance with the process of this invention for manufacturing the composite sheet 1, the second web 52a if incorporated in the composite sheet 1 can be made stretchable and contractible over a wider range. If stated additionally, the composite sheet 1 can also be extended to the point at which the second web 52a reaches a length of 300 mm, i.e., by 100% of the original dimension of the second web 52a.

Figure 4:
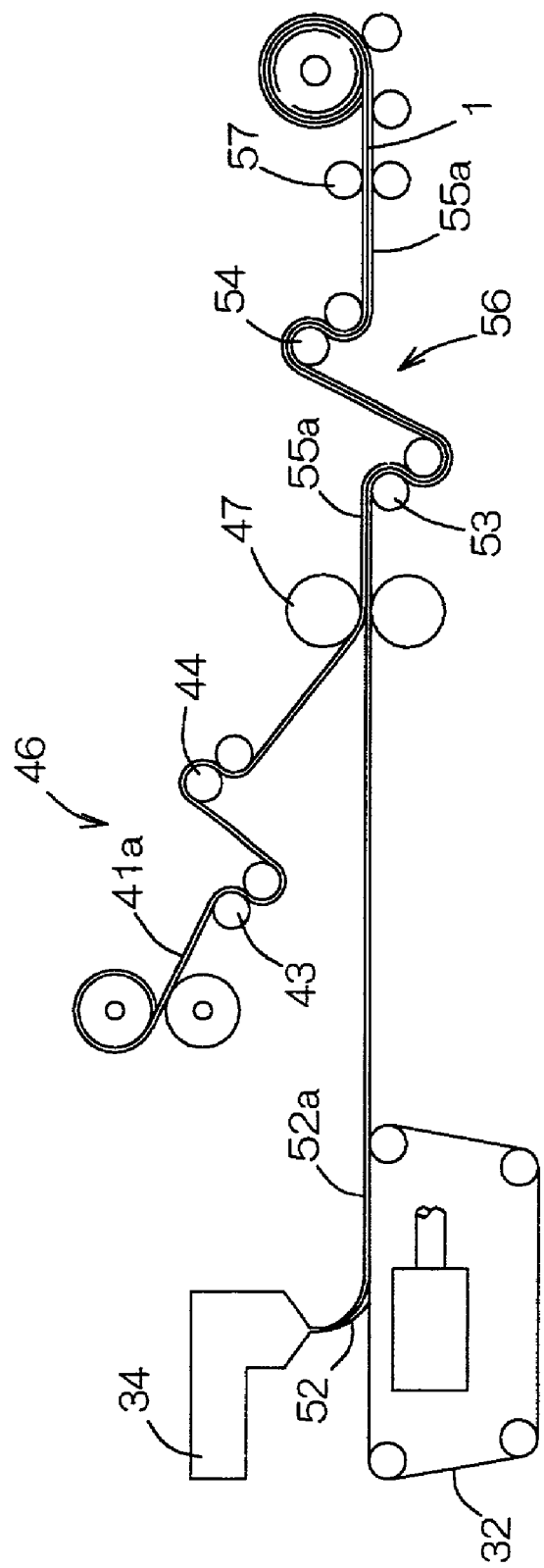
FIG. 4 is a view showing another exemplary process, different from the process of FIG. 2, for manufacturing the composite sheet.

As similar to FIG. 2, FIG. 4 shows an exemplary embodiment of this invention. In the shown process, the second continuous fibers 52 discharged from the second extruder 34 are formed, over the second endless belt 32, into the second web 52a which subsequently advances toward the right in the drawing. The first web 41a in this example is fed in the form of a film made of a thermoplastic elastomer. This film is subjected to the first extension step 46, involving a pair of first rolls 43 and a pair of second rolls 44, in which it is extended at a specific extension ratio as required. The first web 41a while in an extended state is placed on the second web 52a and united therewith between a pair of emboss rolls 47 and 47, resulting in the formation of the composite web 55a. The composite web 55a is further extended in the second extension process 56 involving a pair of third rolls 53 and a pair of fourth rolls 54. After passage between the fourth rolls 54, the composite web 55a is allowed to retract in an area between the fourth roll 54 and the carrying roll 57 by the elastic retraction force of the firstweb 41a. The resulting composite sheet 1 is then wound round a roll. The process shown in FIG. 4 is similar to that of FIG. 1, with the exception that the film is used for the first web 41a.

In the manufacturing process of a composite sheet in accordance with this invention, the second web 52a capable of inelastic extension is used having a breaking extension of 40% or higher, preferably 70% or higher, more preferably 100% or higher, at least in the machine direction, out of the machine and cross directions. The first web 41a capable of elastic stretch and contraction preferably has a breaking extension higher than that of the second web 52a. More preferably, the first web sustains its elastic stretchability even at the breaking extension of the second web 52a. In the manufacture of the composite sheet 1, the composite web 55a comprising the first web 41a and second web 52a can be extended up to the vicinity of the breaking extension limit of the second web 52a. In the case where the constituent fibers 52 of the second web 52a are engaged with each other by mechanical entanglement or fusion bond, it is preferred that the second continuous fibers 52 are largely freed from the engagement and individualized in the second extension step 56. This increases a bulk of the second web 52a as it retracts, thereby providing a softer skin contact.

In this invention, the composite sheet 1 can be rendered into a three-layer structure by placing the second web 52a on top and bottom surface of the first web 41a. In such a case, the second webs 52a, 52a joined to the top and bottom surfaces of the first web 41a may be of the same properties or made different from each other in any of the following properties; basis weight, density, type of the thermoplastic synthetic resin used to form the continuous fibers 52, fiber diameter and fiber length. The first and second continuous fibers 41, 52 used in the preceding embodiments may be altered to short fibers with a length of 50 mm or less, or to long fibers having a length in the approximate range of 50–300 mm. Long fibers with a length of 100 or greater can also be used.

In the manufacturing process of a composite sheet in accordance with this invention, a web capable of elastic stretch and contraction is first extended, another web capable of inelastic extension is placed on the web while in an extended state, the two webs are united together and thereafter extended again in a machine direction. Accordingly, the composite sheet that results when the combination is freed from the tension exhibits a higher percentage of elastic stretch compared to stretchable sheets made by a conventional process which involves superimposing a web capable of elastic extension and a web capable of inelastic extension, uniting them together and then subjecting the combination to extension.

What is claimed is:

1. A process for manufacturing a composite sheet capable of elastic stretch and contract in one direction, said process comprising:

(a) continuously feeding, in the one direction, a first web capable of elastic stretch and contraction and having a top surface and a bottom surface;

(b) extending said first web in the one direction within a range that permits elastic stretch and contraction of the first web;
(c) continuously feeding a second web capable of inelastic extension and composed of thermoplastic fibers along the one direction;
(d) superimposing said second web on at least one surface of the extended first web and joining said second web to the first web in an intermittent manner along the one direction to provide a composite web;
(e) extending the composite web in the one direction within a range that permits elastic stretch and contraction of the first web; and
(f) allowing the extended composite web to retract by an elastic contraction force of the first web to thereby obtain a composite sheet in which individual thermoplastic fibers of the second web are neither fused nor mechanically entangled tightly with each other between discrete areas where the first and second webs are joined together in step (d).

2. The process of claim 1, wherein said thermoplastic synthetic fibers of the second web are engaged with each other by mechanical entanglement or fusion bonding and in step (e), the thermoplastic synthetic fibers are partly freed from the engagement to the extent that they individualized.

3. The process of claim 1, wherein two second webs are provided with one second web joined to the top surface of the first web and another second web joined to the bottom surface of the first web, and the second webs respectively joined to the top and bottom surfaces of the first web being distinguished from each other by at least one property selected from the groups consisting of basis weight, density, type of the thermoplastic synthetic resin, diameter, and length of the fibers thereof.

4. The process of claim 1, wherein said first web comprises at least one of an elastically stretchable fabric composed of thermoplastic synthetic fibers and an elastically stretchable film made of a thermoplastic synthetic resin.

5. The process of claim 1, wherein said thermoplastic synthetic fibers in the second web comprise continuous fibers.

* * * * *